United States Patent
Ashkar et al.

(10) Patent No.: US 12,493,470 B2
(45) Date of Patent: Dec. 9, 2025

(54) ACCELERATED DRAW INDIRECT FETCHING

(71) Applicant: ADVANCED MICRO DEVICES, INC., Santa Clara, CA (US)

(72) Inventors: Alexander Fuad Ashkar, Winter Park, FL (US); Michael Mantor, Orlando, FL (US); Rex Eldon McCrary, Orlando, FL (US); Yi Luo, Issaquah, WA (US); Manu Rastogi, Orlando, FL (US); James Robert Klobcar, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 276 days.

(21) Appl. No.: 18/127,395

(22) Filed: Mar. 28, 2023

(65) Prior Publication Data
US 2024/0192994 A1    Jun. 13, 2024

Related U.S. Application Data

(60) Provisional application No. 63/431,917, filed on Dec. 12, 2022.

(51) Int. Cl.
G06F 9/38    (2018.01)
(52) U.S. Cl.
CPC .................... *G06F 9/383* (2013.01)
(58) Field of Classification Search
CPC .............. G06F 9/383; G06F 12/0862
USPC ............... 345/522; 712/37, E9.05; 711/137
See application file for complete search history.

(56) References Cited

U.S. PATENT DOCUMENTS

| | | | |
|---|---|---|---|
| 5,768,575 A * | 6/1998 | McFarland | G06F 9/30185 712/E9.05 |
| 7,890,702 B2 | 2/2011 | Lauterbach | |
| 9,946,659 B2 * | 4/2018 | Dittmann | G06F 15/7821 |
| 10,387,319 B2 * | 8/2019 | Adler | H03K 19/17736 |
| 10,963,295 B2 * | 3/2021 | Feehrer | G06F 13/4295 |
| 2010/0076915 A1 * | 3/2010 | Xu | G06N 3/063 706/25 |
| 2013/0185517 A1 * | 7/2013 | Elboim | G06F 12/0862 711/137 |
| 2015/0052332 A1 * | 2/2015 | Mortensen | G06F 15/7889 712/37 |
| 2018/0114290 A1 * | 4/2018 | Paltashev | G06T 1/20 |
| 2019/0101973 A1 * | 4/2019 | Ashkar | G06F 1/324 |
| 2020/0183686 A1 * | 6/2020 | Healy | G06F 9/30036 |
| 2022/0091847 A1 | 3/2022 | Ashkar et al. | |
| 2022/0334634 A1 * | 10/2022 | Lovell | G06F 9/3877 |

* cited by examiner

*Primary Examiner* — Prabodh M Dharia

(57) ABSTRACT

Techniques for implementing accelerated draw indirect fetching are disclosed. A fetch accelerator enables streamlined data fetching by looping internally and filling a draw queue for a micro engine. By using a dedicated fetch accelerator rather than processing data fetches separately and individually using a conventional processor, significant processing overhead is eliminated and computational latency is reduced. Additionally, different types of aligned or unaligned data structures are usable with equivalent or nearly equivalent performance.

20 Claims, 4 Drawing Sheets

ACCELERATED DRAW INDIRECT FETCHING

BACKGROUND

Microprocessor designers have attempted to achieve higher performance through a variety of improvements to standard instruction sets. For example, some instructions attempt to take advantage of multiple memory caches, arranged hierarchically and shared by multiple cores or execution units to hide memory latency. Additionally, support for types of instructions known as pre-fetches are often added to microprocessor designs so that data or instructions are loaded into cache memory before the microprocessor needs them. Pre-fetching data offers the performance advantage of the relatively faster access time of cache memory compared to system memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Although pre-fetching data offers some performance advantages, repetitive execution of pre-fetch instructions to load a data stream or a large pattern of data is often inefficient. For example, in graphics processing, a draw indirect command takes parameters from a graphics processing unit buffer rather than from a call itself. That is, rather than receiving all of the required information from a direct draw command, draw indirect commands provide pointers to memory locations where required information is stored. For example, an indirect draw command often includes a pointer or other reference to an "indirect buffer," which enables a graphics processing unit, upon executing the indirect buffer command, to initiate execution of the corresponding commands stored at the indirect buffer. Using indirect buffers allows the processing system to isolate commands associated with different drivers or applications to different regions of memory, for example, enhancing system security and reliability.

However, draw indirect commands typically require a number of fetches, which often cause bottlenecks due to limited memory bandwidth. In some conventional implementations of draw indirect fetches, two non-synchronized fetches are utilized: one for a pre-fetch processor (PFP) that parses and prepares fetches and one for a micro engine (ME) processor (performed by a state queue fetcher) that processes certain graphic commands. However, because the fetches are not synchronized and there is limited ability to correlate pre-fetched data with data fetched for the ME, various issues often occur, particularly in cases of multiple independent fetches and/or pipeline resets. Furthermore, inefficiencies in data fetching often lead to significant processing latency, which results in lower processing throughput and, e.g., low overall frames per second.

FIGS. 2-5 illustrate techniques for implementing accelerated draw indirect fetching in accordance with various embodiments. In some embodiments, a fetch accelerator enables streamlined data fetching by looping internally and filling a draw queue for a micro engine independently from other graphics processors. By using a dedicated fetch accelerator rather than processing data fetches separately and individually using a conventional processor, significant processing overhead is eliminated, and computational latency is reduced. Additionally, graphics processing commands or data are either contiguous, or "aligned," or separated from one another, or "unaligned," in memory. By using the techniques disclosed herein, different types of aligned or unaligned data structures are usable with equivalent or nearly equivalent performance.

Figure 1:
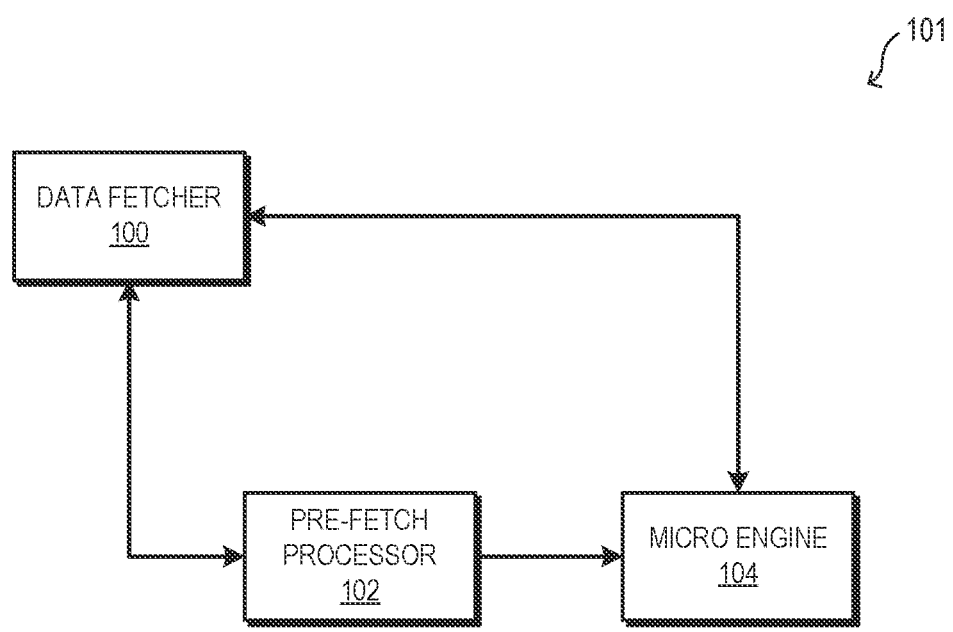
FIG. 1 is a block diagram illustrating inefficiencies in conventional memory access techniques.

FIG. 1 is a block diagram of a conventional system 101 for accessing memory in a graphics pipeline. In this example, a data fetcher 100 separately provides requested data to both a PFP 102 and a ME 104 (in some embodiments, the ME is a co-processor or graphics command processor). Additionally, the PFP 102 provides data to the ME 104. However, due to limitations in memory bandwidth and inefficiencies in memory access techniques, multiple fetches are often initiated for identical data, as the PFP 102 is not configured to provide all of the requisite information to the ME 104, despite having received the information from the data fetcher 100, such that the ME 104 must then request identical data from the data fetcher 100. This inefficiency often leads to noticeable latency and data mismatches due to fetches being processed at different times for different components with limited ability to correlate data received from different sources, such as the data fetcher 100 and the PFP 102.

Figure 2:
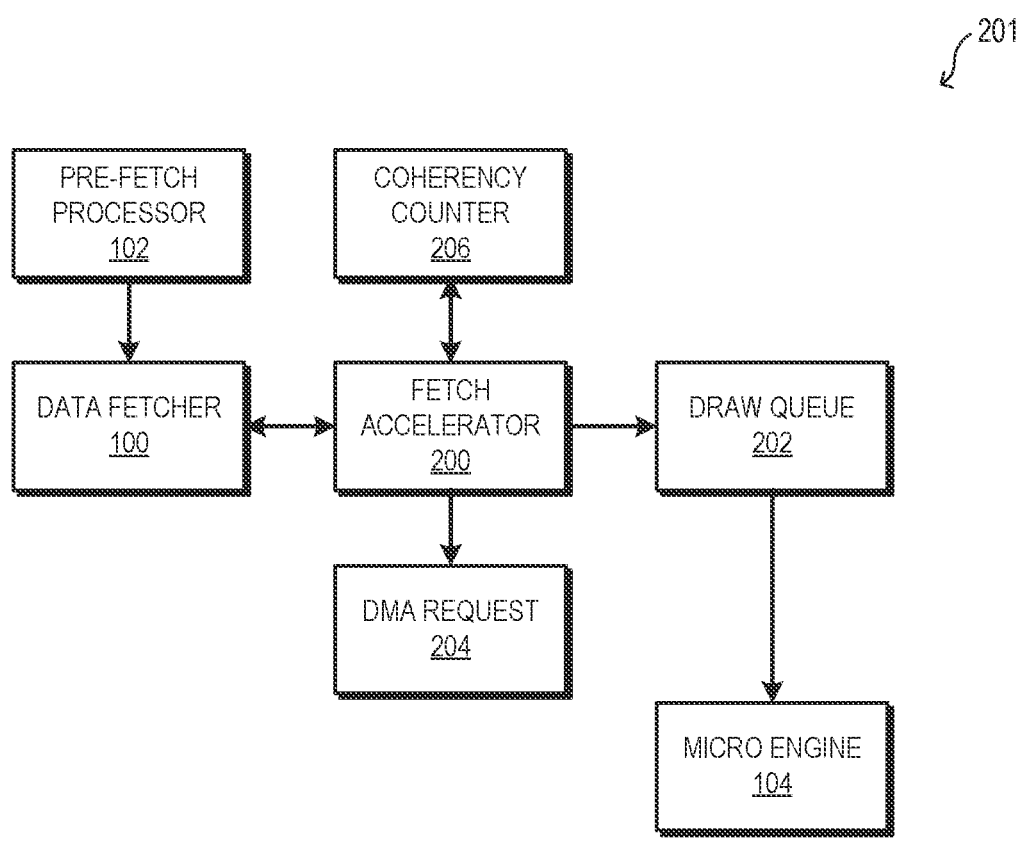
FIG. 2 is a block diagram of a system for accelerated draw indirect fetching in accordance with some embodiments.

FIG. 2 is a block diagram of an accelerated draw indirect fetching system 201 in accordance with some embodiments, which alleviates the inefficiencies of the conventional system 101 of FIG. 1. In some embodiments, during graphics processing, packets are fetched from one or more data fetchers such as data fetcher 100. In some embodiments, the PFP 102 receives an indirect draw packet from a graphics pipeline (e.g., from a shader), and, in response to receiving the packet, delegates data fetching processing to a fetch accelerator 200 to independently, iteratively fetch a number of data structures indicated or implied by the packet independently from the PFP 102. In this way, the PFP 102 and ME 104 are both able to access requisite data without issuing redundant fetch requests and continue processing without delays that would otherwise result from managing fetch requests.

In some embodiments, data structures flow from the data fetcher 100 to the fetch accelerator 200, which in various embodiments comprises circuitry of a co-processor, fixed-function hardware, or a finite state machine. To initiate this data flow, the fetch accelerator 200 receives a command from the PFP 102 indicating a type and number of data structures to process. The fetch accelerator 200 then processes those data structures and transmits related direct memory access (DMA) fetch requests to a geometry engine (not shown). In some embodiments, the fetch accelerator 200 processes the data structures (e.g., retrieves the data structures and combines and/or concatenates the data as needed to prepare the data for consumption by, e.g., the ME 104) and loops internally using a counter configured based on the type and number of data structures. For example, if the PFP 102 indicates to the fetch accelerator 200 that 160 data structures need to be processed, in some embodiments, the fetch accelerator 200 sets a counter equal to 160 and decrements the counter after each subsequent data structure is retrieved until all of the data is processed. The fetch accelerator 200 then forwards a specified portion of the data to a draw queue 202 (or draw indirect queue), which the ME 104 uses to write the shader persistent state followed by a draw initiate command.

In some embodiments, the data fetcher 100 performs data fetching and virtual to physical address translation. Instead of handling requests individually, the fetch accelerator 200 or PFP 102 provides a start address of a list of data structures, a size or number, and optionally a stride (discussed further hereinbelow). In this way, the data fetcher 100 is able to make much larger requests to memory, which allows for requesting more than one data structure per request. In some embodiments, the data fetcher 100 stores the retrieved data in a reorder queue (not shown) that rearranges data retrieved for out-of-order memory requests to its proper order before sending a request to the fetch accelerator 200. Accordingly, in some embodiments, the fetch accelerator 200 does not issue any memory requests of its own and instead reads out of the reorder queue that the data fetcher 100 populates based on instructions from the PFP 102. After the fetch accelerator 200 has processed the retrieved data, it then forwards the same data or a subset of the data into the draw queue 202 for processing by the ME 104, as described above.

In some embodiments, the data fetcher 100 is commanded by the fetch accelerator 200 to fetch multiple data structures, either all in one large fetch (e.g., when the data structures are aligned, i.e. contiguous, in memory) or in multiple smaller fetches (e.g., when the data structures are stride aligned, i.e., separated by predetermined gaps in memory or a "stride"). As the data becomes available, the fetch accelerator 200 retrieves the data from the data fetcher 100 and, as the fetch accelerator 200 consumes the data to generate a DMA request 204 at a graphics engine (not shown), the fetch accelerator 200 forwards either the same or a different subset of the data to the draw queue 202 for the ME 104 to generate draw initiators. In some embodiments, the draw queue 202 is sized to store a specified number of DWORDs, which are 32-bit unsigned integers, or "DWs") to account for common graphics processing data structures, such as IndexCount, which is the number of indices to use for drawing, and InstanceCount, which is used to generate primitive IDs, along with a programmable payload of DWs being forwarded to the ME 104 (see, e.g., FIGS. 3 and 4, discussed further hereinbelow). For example, in some embodiments, the draw queue 202 is sized to store up to 160 DWs. In some embodiments, the draw queue 202 size corresponds to the total number of DMA requests the PFP 102 and/or fetch accelerator 200 is able to issue to the graphics engine, e.g., 32 maximum, multiplied by the size of each data structure required by the ME 104, e.g., 5. In some embodiments, this equates to 32*5 or 160 DWs. In some embodiments, the data fetcher queue is increased to 256, 384, 512, or more DWs.

However, data structures need not be aligned to be utilized in accelerated indirect draw fetching. In some embodiments, the data structures are misaligned (i.e., not contiguous in memory) but are stride aligned. In this case, in some embodiments, the fetch accelerator 200 provides the stride to the fetcher such that the fetcher automatically fetches the data according to the provided stride. In some embodiments, the fetch accelerator 200 generates an address-adjusted fetch for each unaligned data structure. In some embodiments, the data fetcher 100 aligns the data structures in hardware to minimize the required number of fetch instructions, e.g., by utilizing an offset provided by the PFP 102. In this way, in some embodiments, unaligned and aligned data structures are processed with equal or near equal efficiency and performance after a reorder queue associated with the data fetcher 100 is at least partially filled.

In some embodiments, the data fetcher 100 supports flexible index indirect draw data structures, such as that shown in FIG. 4 and discussed further hereinbelow. In some embodiments, the data fetcher fetches 32 DWs or 8 or 6 data structures per fetch, depending on the data structure type, thus improving throughput compared to conventional embodiments. In some embodiments, the data fetcher 100 is shared such that the PFP 102 controls a multiplexer (not shown) that controls whether the data fetcher provides data to the PFP 102 or the fetch accelerator 200.

In some embodiments, the data fetcher 100 supports backpressure. For example, in some embodiments, the data fetcher 100 or a portion thereof is configured to pause processing or enter a sleep state when the fetch accelerator 200 is busy or the draw queue 202 is full. In some embodiments, the data fetcher 100 includes an increased input FIFO to support multiple (e.g., up to four or more) pending requests in order to conceal processing latency. For example, in FIG. 2, backpressure flows generally from right to left, where, e.g., the ME 104 receives backpressure from the graphics pipeline through, e.g., the register bus (not shown) or an out of context state resulting in a stall. However, the fetch accelerator 200 continues to execute (e.g., looping internally), populating the draw queue 202 until it is full. In this way, in some embodiments, multi-cycle operations are able to be disguised as single-cycle operations by ensuring that the queue remains at least partially populated. This also enables different types of aligned or unaligned data structures to be usable with equivalent or nearly equivalent performance.

In some embodiments, a coherency counter 206 (e.g., one per pipeline) keeps track of the data fetcher 100 data for indirect draw purposes. This counter serves to multiplex the return data for the data fetcher 100 between the fetch accelerator 200 and microcode using the data fetcher 100, e.g., for predictive processing or other purposes. For example, in some embodiments, the coherency counter tracks states that are read from memory, which may indicate, e.g., when a number of data structures were written to the draw queue 202 or which process(es) are associated with different data structures. In some embodiments, every state that ME 104 writes to the register bus (not shown) is written to memory at the same time. However, in the case of preemption or another function that, e.g., restores an application, the ME 104 needs to read the appropriate state from memory. In some embodiments, the coherency counter ensures memory coherency by tracking states written to or read from memory such that the loading of unintended states is avoided.

Figure 3:
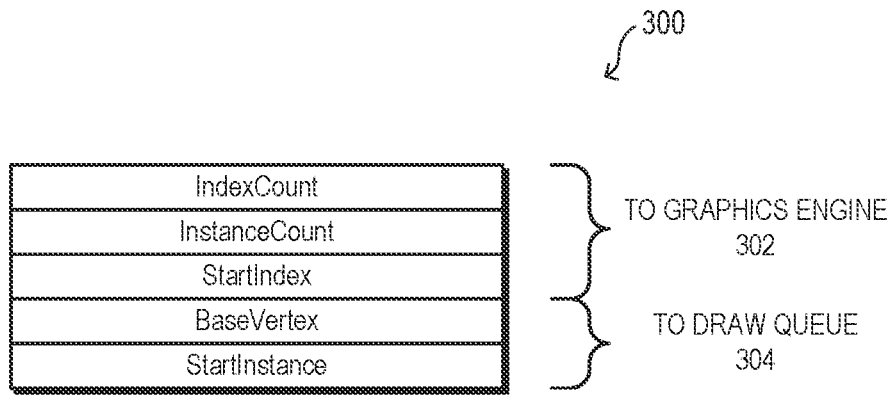
FIG. 3 is a block diagram illustrating data flow in an accelerated draw indirect fetching system using a conventional data structure.

FIG. 3 is a block diagram of a data flow using a conventional data structure 300 in accordance with some embodiments. For indexed indirect draws, as shown, existing application programming interface (API) structure definitions (i.e., predefined variables used by the API) include Index-Count, InstanceCount, StartIndex, BaseVertex, and StartInstance DWORDS. In some embodiments, a shader writes a collection of API structures (e.g., FIGS. 3 and/or 4), which flow to the fetch accelerator 200, after which the fetch accelerator 200 issues a DMA request to a geometry engine in preparation for a draw command that will utilize the requested data. For example, in some embodiments, the fetch accelerator 200 combines an index type stored in the conventional data structure 300 and a base address set by the PFP 102 to generate the necessary values to issue a DMA request to a geometry engine based on a first portion 302 of the conventional data structure 300. The fetch accelerator 200 then transfers the portions 304 of the conventional data structure 300 needed by the ME 104 into the draw queue 202.

In some embodiments, the fetch accelerator 200 is configured to process and/or interpret the conventional data structures 300 or other data structures (such as that of FIG. 4, described further hereinbelow) based on hardcoded memory values indicating the size of different data structures and the type of data structures to be retrieved, as indicated by the PFP 102. However, in some embodiments, the fetch accelerator 200 is reconfigurable and memory values indicating sizes of different data structures are rewritable. The ME 104 then uses the data in the draw queue 202 in combination with the data from the DMA request to generate indirect draw commands. Accordingly, in some embodiments, only one fetch is required for each data structure containing data needed by the graphics engine and/or the ME 104, although the data is consumed in multiple places. In some embodiments, the draw queue 202 includes two or more queues to enable multipipelined/multithreaded operation.

In some embodiments, the PFP 102 receives an indirect draw packet (e.g., the indirect draw packet illustrated in FIG. 3), processes the packet, and causes the data fetcher 100 to fetch a linear list of data structures corresponding to a total number of data structures indicated or implied by the indirect draw packet (as shown in FIG. 3, the traditional data structure contains 5 DWs). In some embodiments, the PFP 102 programs the data fetcher 100 to feed the fetch accelerator 200 with a sequence of the data structures. The fetch accelerator 200 interprets the five records in each data structure, programs another fetch based on three of the records, and transmits the other two records to the draw queue 202 for use by the ME 104.

The PFP 102 provides the fetch accelerator 200 with a number of data structures to fetch, and so, in some embodiments, a single command causes the fetch accelerator 200 to loop internally, e.g., thousands of times. Because the draw queue 202 is embedded within the system shown in FIG. 2, the ME 104 and/or PFP 102 are able to continue executing instructions while the fetch accelerator 200 keeps the queues filled or at least partially populated, thus concealing otherwise noticeable latency. In some embodiments, the fetch accelerator 200 terminates fetching and/or other activities before completing a specified number of fetches, such as in the case of processor preemption. Accordingly, in some embodiments, the fetch accelerator 200 is preempted during processing and, optionally, resumed at a later time. In some embodiments, this functionality simplifies a process of resetting an overall graphics pipeline due to the ability to simultaneously terminate operations (e.g., based on an instruction from another entity in hardware or software) of the PFP 102 and the ME 104 by interrupting the shared data flow, thus creating a single preemption point common to both the PFP 102 and the ME 104.

Figure 4:
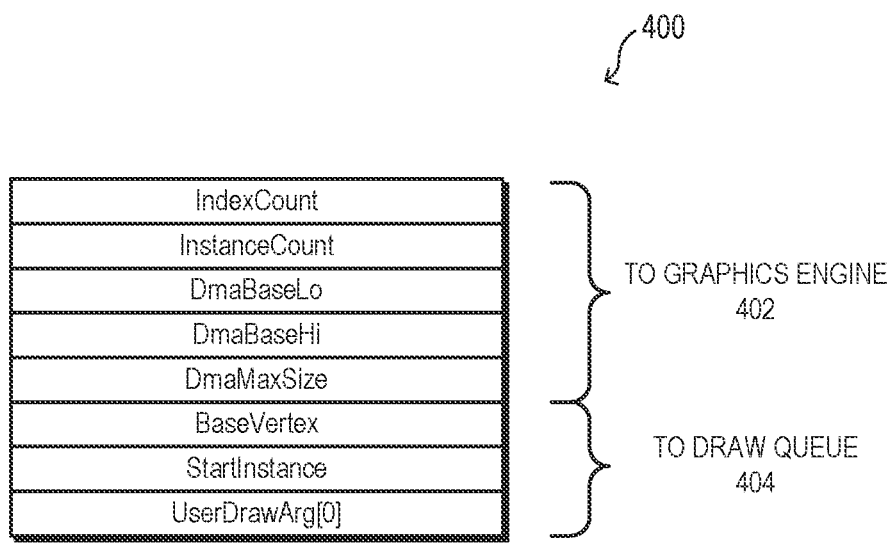
FIG. 4 is a block diagram illustrating data flow in an accelerated draw indirect fetching system using a flexible index indirect draw data structure in accordance with some embodiments.

FIG. 4 is a block diagram of a data flow using a flexible index indirect draw data structure 400 in accordance with some embodiments. Notably, in some embodiments, the same engine in the fetch accelerator 200 is capable of interpreting both of the data structures shown in FIGS. 3 and 4. In some embodiments, the PFP 102 transmits information to the fetch accelerator 200 regarding a type and number of data structures to be retrieved. The fetch accelerator 200 then executes a loop, repeatedly retrieving the appropriate number of data structures that match the information from the data fetcher 100 and storing the data structures in the draw queue 202.

For task shaders, in some embodiments, the fetch accelerator 200 supports a mode for indexed indirect draw commands by processing DmaBaseLo/Hi and/or DmaMaxSize data structures, which specify the locations and size of the indexed commands, respectively, along with three payload registers to be written to shader persistent states (e.g., via the draw queue 202). The hardware fetch accelerator 200 processes each data structure one-by-one, programs DMA registers as needed, and then forwards only the required portions of the data structure to the ME to write the shader states and issue the draw initiator. For example, in some embodiments, the fetch accelerator 200 issues a DMA request to a geometry engine based on a first portion 402 of the flexible index indirect draw data structure 400. The fetch accelerator 200 then transfers the portions 404 of the flexible index indirect draw data structure 400 needed by the ME 104 into the draw queue 202. So as to not change legacy packet behavior, in some embodiments, a novel draw packet like that shown in FIG. 4 is used in an enhanced task shader mode.

Figure 5:
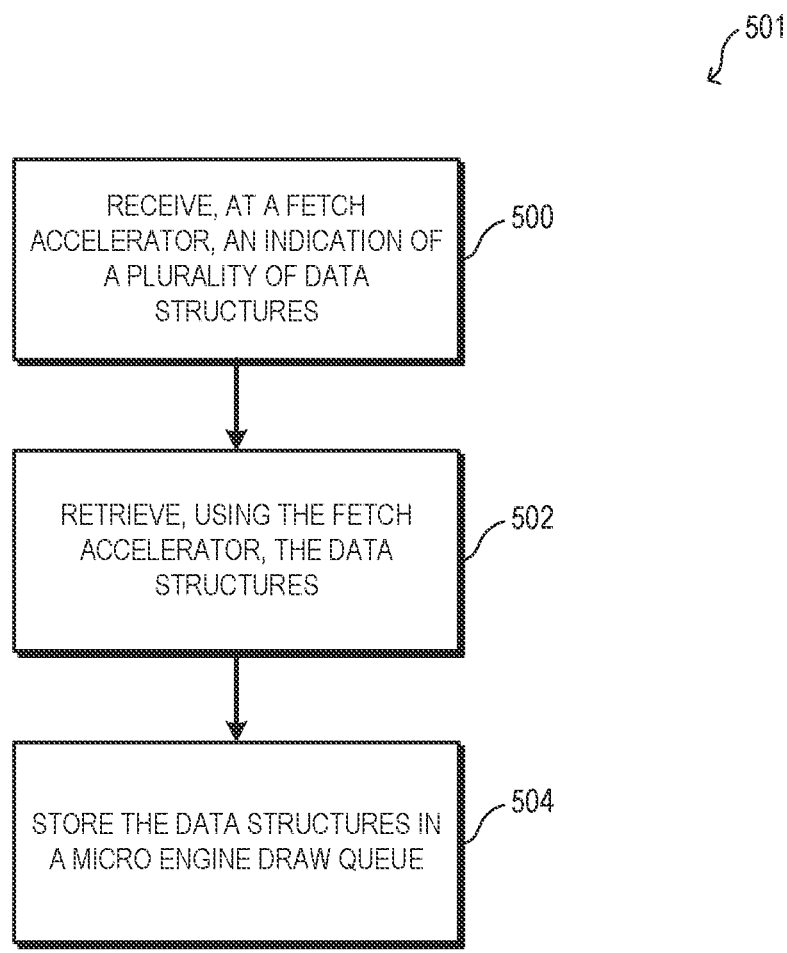
FIG. 5 is a flow diagram illustrating a method for accelerated draw indirect fetching in accordance with some embodiments.

FIG. 5 is a flow diagram illustrating an accelerated draw indirect fetching method 501 in accordance with some embodiments. As described herein, in some embodiments, the method 501 includes receiving, at a fetch accelerator such as the fetch accelerator 200 of FIG. 2, an indication of a plurality of data structures at block 500, retrieving, using the fetch accelerator, the data structures at block 502, and storing the data structures in a micro engine draw queue, such as the draw queue 202 of FIG. 2, at block 504. As described above, the ME 104 then retrieves data from the draw queue 202 without having to issue numerous, duplicative fetch requests to the data fetcher 100. Additionally, the coherency counter 206 ensures memory coherency by tracking states written to or read from memory such that the loading of unintended states is avoided.

In some embodiments, the apparatus and techniques described above are implemented in a system including one or more integrated circuit (IC) devices (also referred to as integrated circuit packages or microchips), such as the accelerated draw indirect fetching systems and methods described above with reference to FIGS. 2-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a fetch accelerator, an indication of a plurality of data structures from a pre-fetch processor;
   retrieving the data structures using the fetch accelerator based on the indication; and
   iteratively storing the data structures in a micro engine draw queue based on the indication.

2. The method of claim 1, wherein the fetch accelerator comprises a processor, fixed-function hardware, or a finite state machine.

3. The method of claim 1, wherein the fetch accelerator executes the retrieving and storing independently from the pre-fetch processor after receiving the indication.

4. The method of claim 3, wherein the fetch accelerator configures a counter based on the indication of the plurality of data structures.

5. The method of claim 4, wherein the fetch accelerator loops internally to repeat the retrieving and storing based on the counter.

6. The method of claim 1, further comprising issuing, using the fetch accelerator, at least one direct memory access (DMA) request to a geometry engine based on one of the data structures.

7. The method of claim 1, further comprising tracking, using a coherency counter, states read from memory by the fetch accelerator.

8. The method of claim 1, wherein the indication of a plurality of data structures comprises a single command indicating a type and a number of data structures.

9. The method of claim 8, wherein the type of the data structures indicates whether the data structures are flexible index indirect draw data structures or conventional data structures.

10. The method of claim 8, wherein the single command further indicates a stride by which the data structures are aligned.

11. A device comprising:
    a micro engine draw queue; and
    a fetch accelerator configured to iteratively populate the micro engine draw queue with data structures based on an indication of a plurality of data structures received from a pre-fetch processor.

12. The device of claim 11, wherein the fetch accelerator comprises a processor, fixed-function hardware, or a finite state machine.

13. The device of claim 11, wherein the fetch accelerator is configured to execute independently from the pre-fetch processor after receiving the indication.

14. The device of claim 11, wherein the fetch accelerator is configured to issue at least one direct memory access (DMA) request to a geometry engine based on one of the data structures.

15. The device of claim 11, further comprising a coherency counter configured to track states read from memory by the fetch accelerator.

16. The device of claim 11, wherein the indication of a plurality of data structures comprises a single command indicating a type and a number of data structures.

17. The device of claim 16, wherein the type of the data structures indicates whether the data structures are flexible index indirect draw data structures or conventional data structures.

18. A system comprising:
a fetch accelerator configured to store data in a micro engine draw queue; and
a pre-fetch processor configured to provide an indication of a plurality of data structures to the fetch accelerator,
wherein the fetch accelerator iteratively stores data structures in the micro engine draw queue based on the indication of a plurality of data structures.

19. The system of claim 18, wherein the fetch accelerator comprises a processor, fixed-function hardware, or a finite state machine.

20. The system of claim 18, wherein the fetch accelerator is configured to execute independently from the pre-fetch processor after receiving the indication.

* * * * *